PULSE DELTA MODULATION TRANSMISSION SYSTEM HAVING SEPARATELY TRANSMITTED LOW-FREQUENCY AVERAGE LEVEL SIGNAL

Filed Nov. 16, 1967 3 Sheets-Sheet 1

INVENTORS
JOHANNES A. GREEFKES
KAREL RIEMENS
BY
[signature]
AGENT

INVENTORS
JOHANNES A. GREEFKES
KAREL RIEMENS
BY
Frank R. Trifari
AGENT

PULSE DELTA MODULATION TRANSMISSION SYSTEM HAVING SEPARATELY TRANSMITTED LOW-FREQUENCY AVERAGE LEVEL SIGNAL

Filed Nov. 16, 1967 3 Sheets-Sheet 3

INVENTORS
JOHANNES A. GREEFKES
KAREL RIEMENS
BY
Frank R. Trifari
AGENT

United States Patent Office 3,518,548
Patented June 30, 1970

3,518,548
PULSE DELTA MODULATION TRANSMISSION SYSTEM HAVING SEPARATELY TRANSMITTED LOW-FREQUENCY AVERAGE LEVEL SIGNAL

Johannes Anton Greefkes and Karel Riemens, Emmasingel, Eindhoven, Netherlands, assignors, by mesne assignments, to U.S. Philips Corporation, New York, N.Y., a corporation of Delaware
Filed Nov. 16, 1967, Ser. No. 683,602
Claims priority, application Netherlands, Nov. 22, 1966, 6616394
Int. Cl. H04b *1/04*
U.S. Cl. 325—38 10 Claims

ABSTRACT OF THE DISCLOSURE

A pulse delta modulation system in which an average level control voltage controlled by the average level of the signals is transmitted by a separate transmitting device, for example another delta modulation system. The energy content of the pulses applied to the local receiver of the first delta modulation system is modulated by the separate transmitting device. Thus the amplitude and frequency of the pulses varies with the average level of the modulating signal, reducing quantizing noise for low level signals and the bandwidth required for transmission. At the remote receiver, the received average level signal is used to modulate the energy content of the regenerated pulses.

Figures 1, 2, 3A, 3B, 3C, 3D:
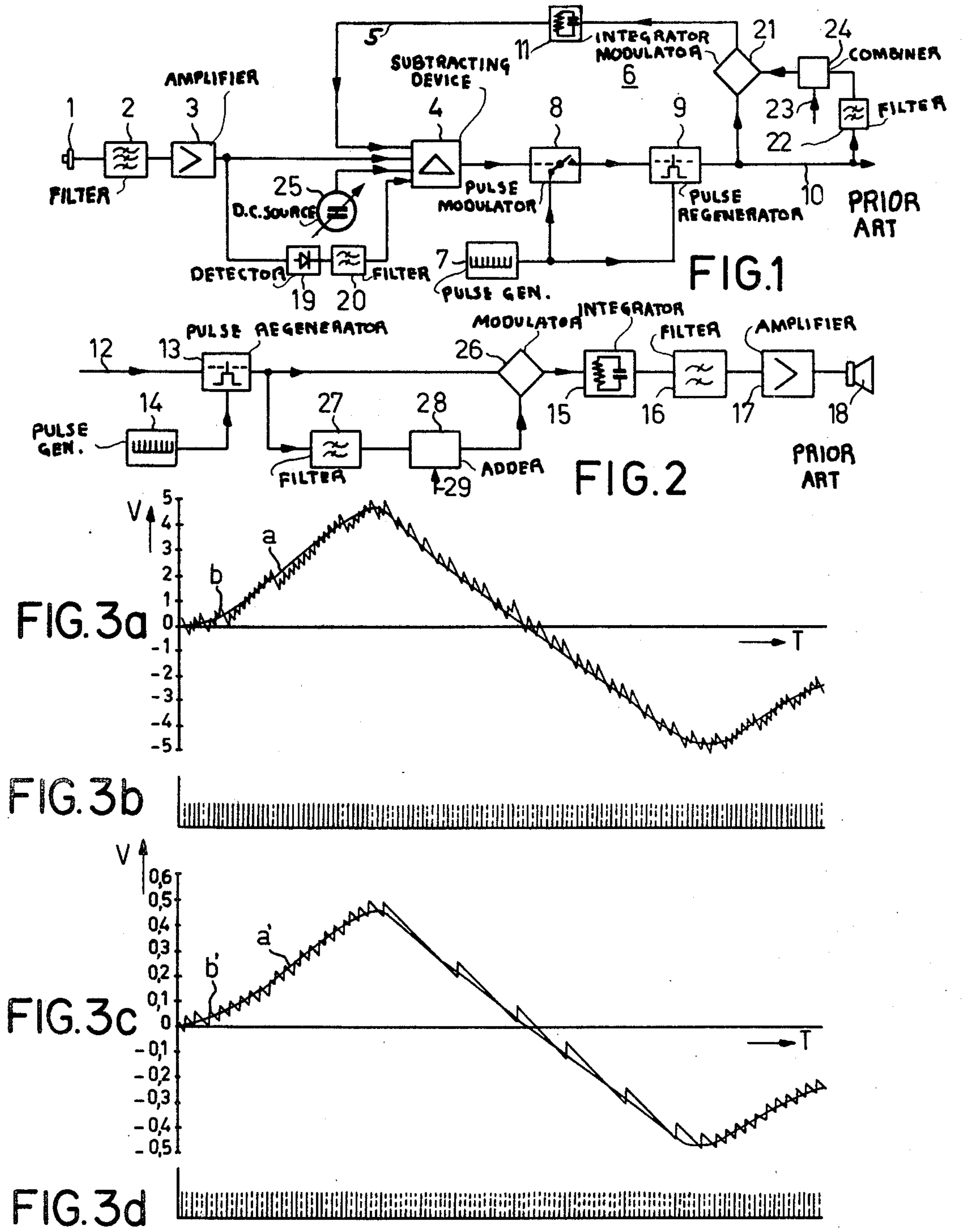

The invention relates to a pulse delta modulation transmission system and to the transmitters and receivers to be employed in said system, the transmitter comprising a pulse delta modulator connected to a pulse generator, the output pulses of which modulator are transmitted to the receiver concerned, while together with the signals to be transmitted said output signals control, in addition, the pulse delta modulator via a comparison circuit including a local receiver.

With pulse code modulation in general and therefore also with pulse delta modulation the amplitude quantization gives rise to discrepancies between the signal voltage reproduced at the receiver end and the initial signal voltage, said discrepancies producing the so-called quantization noise; particularly with a comparatively low signal voltage or with a low signal level the quantization noise has a disturbing effect, while, in addition owing to the amplitude quantization the transmission of low signal voltages is inaccurate. When the pulse frequency is raised the accuracy of reproduction of this pulse delta modulation system increases and the power of quantization noise in the signal band decreases by the third power of the maximum pulse frequency. The transmission of a speech signal in the frequency band from 0.3–3.4 kcs. requires a pulse frequency of about 40 kcs. in order to ensure a reasonable speed quality by means of pulse delta modulation.

In the applicant's U.S. Pat. 3,249,870 the accuracy of reproduction is improved and the disturbing influence of quantization noise is reduced by providing the transmitting device with a level voltage generator controlled by the signals to be transmitted, the level control signal of which is applied as a control voltage to the pulse delta modulator, while in the circuit of the pulse delta modulator and in the receiver concerned the transmitted pulses are applied to a pulse modulator modulating the energy content of the applied pulses by means of a smoothed direct voltage derived from a smoothing filter fed by the transmitted code pulses. It has thus been possible to reduce the pulse frequency to 16 to 20 kcs. for obtaining a reasonable speech quality.

The invention has for its object to provide a transmission system and the transmitters and receivers of the kind set forth, in which the pulse frequency is further reduced by a factor of 3/2 to 2, which means that it is the very object to approach the pulse frequency theoretically required as a minimum for pulse modulation, which frequency according to the information theory amounts to twice the highest signal frequency to be transmitted.

The system according to the invention is characterized in that in the transmitter the level voltage generator is connected, for transmission of the level control voltage to the receiver concerned, to a separate transmitting device, while between the latter and the pulse modulator there is arranged a local receiving device whose input signal modulates the energy content of the pulses applied to the pulse modulator, the circuit of the pulse delta modulator including a level control voltage compensating device which compensates the varying level control signal at the input of the pulse delta modulator.

The separate transmitting device is formed by a second pulse delta modulation transmitter having a second pulse delta modulator with a local receiver included in the comparison circuit and a pulse generator connected to the pulse delta modulator and providing a frequency lower than that of the pulse generator connected to the first pulse delta modulator, the local receiver of the second pulse delta modulator being connected to the pulse modulator in the circuit of the first delta modulator.

The pulse modulator for the energy content of the code pulses is preferably formed by a pulse amplitude modulation as an alternative, however, a pulse duration modulator may be used.

The invention and its advantages will now be described more fully with reference to the figures.

FIGS. 1 and 2 show in a block diagram a transmitter and a receiver respectively for pulse delta modulation as described in U.S. Pat. No. 3,249,870 and FIGS. *3a–3d* show a few time diagrams for explaining the system shown in FIGS. 1 and 2.

FIGS. *4a–4f* show further time diagrams, and

Figures 5, 6:
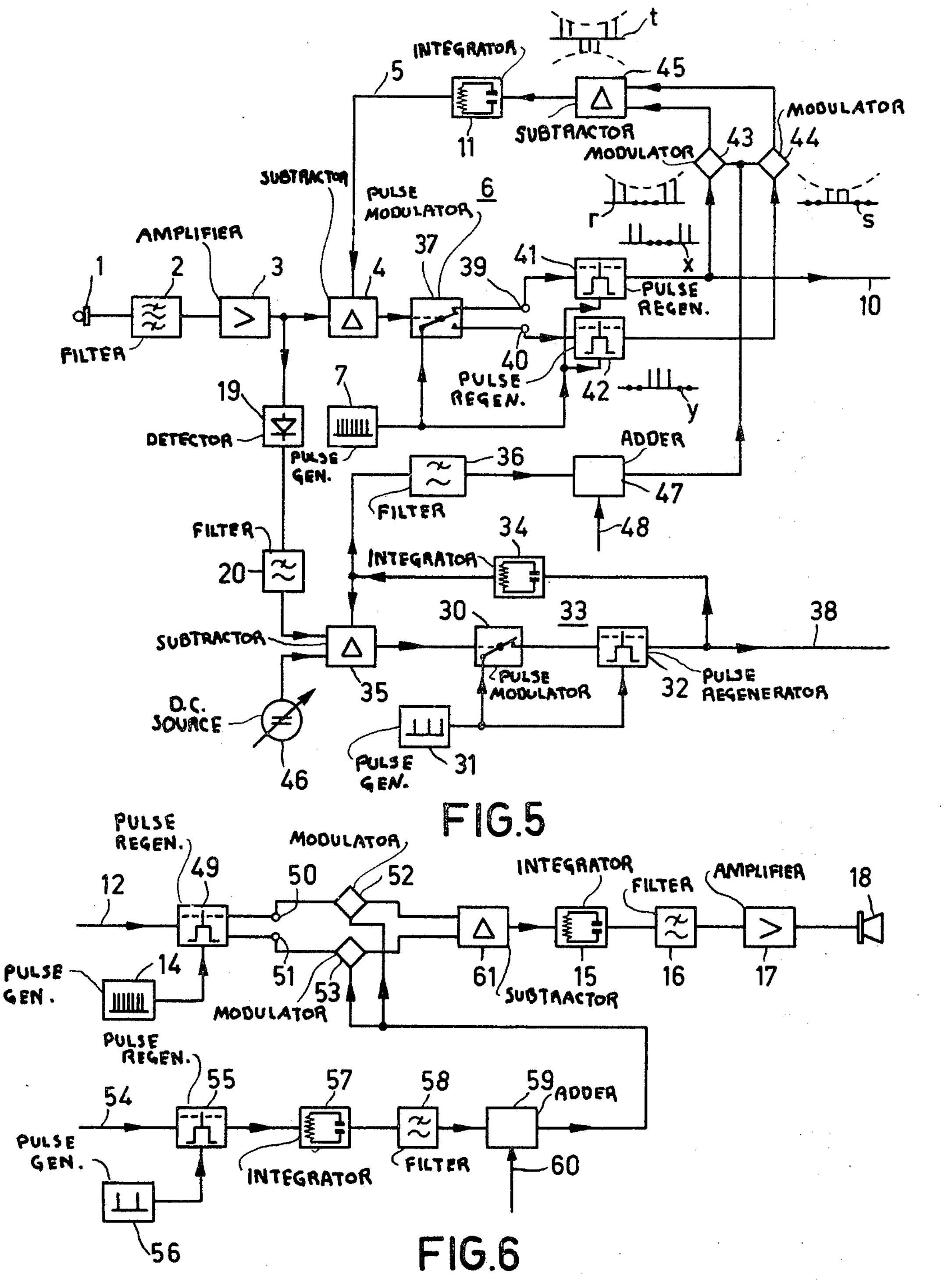

FIGS. 5 and 6 show a transmitter and a receiver respectively according to the invention.

With the transmitter shown in a block diagram of FIG. 1 for pulse delta modulation as described in Pat. No. 3,249,870 the speech signals derived from a microphone 1 are applied via a speech filter 2 having a passband from 0.3 to 3.4 kcs. and a low frequency amplifier 3 to a subtracting device 4.

Via a comparison circuit 5 including a local receiver 6 the subtracting device 4 receives, moreover, a comparison voltage in order to form a difference voltage controlling a pulse delta modulator 8, connected to a pulse generator 7. The pulse generator 7 supplies equidistant pulses of a repetition frequency being an order of magnitude higher than the maximum frequency of the speech signal to be transmitted.

In dependence upon the polarity of the output voltage of the subtracting device 4, pulses from the pulse generator 7 appear at the output of the pulse delta modulator 8 or they are suppressed, the resultant pulse sequence being applied to a pulse regenerator 9 for suppressing the variations in amplitude, duration, form or instant of occurrence of the pulses produced in the pulse delta modulator 8. This regeneration may be performed by replacing the supplied pulses by pulses directly derived from the pulse generator 7. The regenerated pulses are transmitted through the conductor 10, if necessary, subsequent to modulation, on a carrier wave to the receiver concerned and, in addition, applied to the local receiver 6, which includes an integrating network 11 for the signal frequencies having a time constant of, for example, 0.01 second. In this case, if desired, a network as described in U.S. Pat. No. 3,249,870 of the applicant may be employed. At the output of the local receiver 6 the aforesaid comparison voltage is produced, which is applied to the subtracting device 4.

The circuit described above tends to reduce the comparison voltage to zero and, in particular, each time when the comparison voltage at the instant of a pulse from the pulse generator 7 is lower than the signal to be transmitted, that is to say, each time when a positive comparison voltage appears, the pulse delta modulator 8 provides a pulse which is transmitted, subsequent to pulse regeneration, to the receiver concerned and, moreover, to the comparison circuit 5 including the local receiver 6, so that the voltage at the output of the integrating network 11 increases by a fixed amount. During the next-following period a voltage at the integrating network 11 decreases in a sawtooth like fashion and in dependence upon the fact whether the difference voltage is positive or negative at the appearance of a next pulse from the pulse generator 7, this pulse is passed by the pulse delta modulator 8 or is suppressed. In this manner a sawtooth like voltage is produced at the integrating network 11, said voltage oscillating around the speech voltage to be transmitted so that it forms a quantized approximation thereof.

FIG. 2 shows a receiver to be used in conjunction with a transmitter of FIG. 1. The pulses coming in through the conductor 12, which pulses may be distorted, are replaced by means of a pulse regenerator 13, connected to a local pulse generator 14 to be synchronized with the pulse generator 7 of the transmitter by locally produced pulses. These regenerated pulses are applied to a network 15 integrating the signal frequencies, corresponding to the integrating network 11 of the local receiver in the comparison circuit 5 of the transmitter, so that at the output of the integrating network 15 a voltage corresponding to the comparison voltage of the transmitter is obtained. Through a low bandpass filter 16 passing the desired speech frequency band and suppressing frequencies exceeding these values the signal voltage is applied to a low frequency amplifier 17 which is connected to a reproducing device 18.

In order to minimize the disturbing effect of the amplitude quantization noise on the quality of reproduction the transmitter according to Pat. No. 3,249,870 is provided with a level voltage generator fed by the speech signals to be transmitted and formed by a detector 19 and a low bandpass filter 20 having a limit frequency of, for example, 50 Hz., the output voltage of which is applied as a control voltage via the subtracting device 4 to the pulse delta modulator 8, while in the local receiver 6 the pulses transmitted by the pulse delta modulator 8 via the pulse regenerator 9 are applied to a pulse modulator 21, in which the energy content of the incoming pulses is modulated by a smoothed direct voltage component derived from a smoothing filter 22 fed by the transmitted pulses. The pulse modulator 21 may be formed by a pulse amplitude modulator.

In this device, owing to the level control voltage applied via the subtracting device 4 to the pulse delta modulator, the pulse density of the pulses passed by the pulse delta modulator 8 will vary and accordingly at the output of the smoothing filter 22 which smooths the transmitted pulses a comparison voltage varying with the pulse density will appear which modulates the amplitude of the pulses applied to the integrating network 11 in the pulse amplitude modulator 21. The two variations, i.e. the variation of the pulse density and the variation of the pulse amplitude adjust themselves to such values that by smoothing the pulses applied to the integrating network 11 the resultant comparison voltage tends to follow accurately the applied level control voltage, since the circuitry described, as stated above, tends to reduce the difference voltage to zero.

In order to obtain an optimum quality of reproduction it is advantageous to have a variation of the level control voltage compensated for the major part by the amplitude variation of the pulses applied to the integrating network 11, which is achieved by combining via a conductor 23 a constant reference voltage of suitable value with the output voltage of the smoothing filter 22 in a combination device 24. The value of the reference voltage may be adjusted so that in the absence of a speech signal in a pulse amplitude modulator 21 the amplitude of the pulses is reduced to about 5%. With a variation of the level control voltage applied to the pulse delta modulator 8 the amplitude of the pulses derived from the pulse amplitude modulator 21 will vary approximately proportionally to the level voltage while at the same time a variation of the pulse density will occur, which is adjusted in the absence of a speech signal by means of an adjusting voltage from a direct voltage source 25 applied to the subtracting device 4 so that the actual pulse density amounts to about $\frac{3}{10}$ of that associated with the maximum pulse repetition frequency.

When a speech signal is applied to the arrangement described above the amplitude of the pulses applied to the integrating network 11 will match the level of the speech signal; if, for example, the level of the speech signal decreased by a factor 10, the amplitude of the pulses applied to the integrating network 11 also decreases approximately by a factor 10.

For illustrating the operation described above, FIG. 3 shows a few time diagrams; in FIG. 3*a* the curve *a* represents the speech signal to be transmitted in volts and the sawtooth-like curve *b* enveloping the curve *a* represents the comparison voltage at the output of the integrating network 11. In FIG. 3*b* the transmitted pulses are represented by full lines whereas the pulses suppressed by the pulse delta modulator 8 are indicated by broken lines.

For a lower signal voltage, for example, a signal voltage 10 times lower, and hence for a signal level 10 times lower, FIG. 3*c* shows graphs corresponding with those of FIG. 3*a* on a $\frac{1}{10}$ volt scale; the curve *a'* illustrates the speech signal to be transmitted which differs from the speech signal illustrated in FIG. 3*a* by a ten times lower amplitude, whereas the comparison voltage is represented by the curve *b'*. FIG. 3*d* shows, like FIG. 3*b*, the transmitted pulses.

On the one hand by the adaptation of the amplitude of the pulses applied to the integrating network 11 to the level of the speech signal the comparison voltage approached considerably more accurately the speech signal than without this measure, and on the other hand, especially with a low signal level the disturbing effect of the quantization noise is reduced by the reduction of the amplitude of the pulses applied to the integrating network 11, since the power of the quantization noise diminishes proportionally to the square of the amplitude of said pulses. These two effects, i.e. the more accurate approximation of the speech signal and the reduction of the quantization noise result in a considerable improvement of the reproduction quality which permits of reducing the pulse frequency by a factor of about 2 for obtaining a reasonable reproduction quality. With a speech signal if, for example, 0.3 to 3.4 kcs. the pulse frequency may be reduced to 16 to 20 kcs.

In the associated receiver of FIG. 2 the transmitted pulse sequence is processed in the same manner as in the local receiver in the transmitter for restoring the transmitted speech signal; that is to say, the pulses obtained from the pulse regenerator 13 are applied on the one hand to a pulse amplitude modulator 26 and on the other hand to a smoothing filter 27 whose output voltage, subsequent to combination in a combination device 28 with a constant reference voltage from the conductor 29, forms the modulated voltage of the pulse amplitude modulator 26. The amplitude-modulated output pulses of the pulse amplitude modulator 26 are applied, subsequent to integration in the integrating network 15 and smoothing in the low bandpass filter 16, via the low frequency amplifier 17 to the reproducing device 18.

As stated above the pulse delta modulation arrangement so far described permits of transmitting a speech signal with reasonable reproduction quality at a pulse frequency of 16 to 20 kcs. However, it has been found that further reduction of the pulse frequency causes a sharp reduction of the reproduction quality and of the intelligibility due to interference frequencies and intermodulation frequencies occurring inside the speech frequency band. Elaborate investigations have shown that the influence on the reproduction quality in accordance with lower pulse frequencies is mainly due to the fact that the varying pulse density for the transmission of the level control signal is of a quantization nature, which gives rise to the quite unexpected phenomenon that the level control voltage in the frequency band of 0 to 50 c./s. produces the interference frequencies in the speech frequency band from 300 to 3400 c./s., which will now be described with reference to the time diagrams of FIG. 4.

Figures 4A, 4B, 4C, 4D, 4E, 4F:
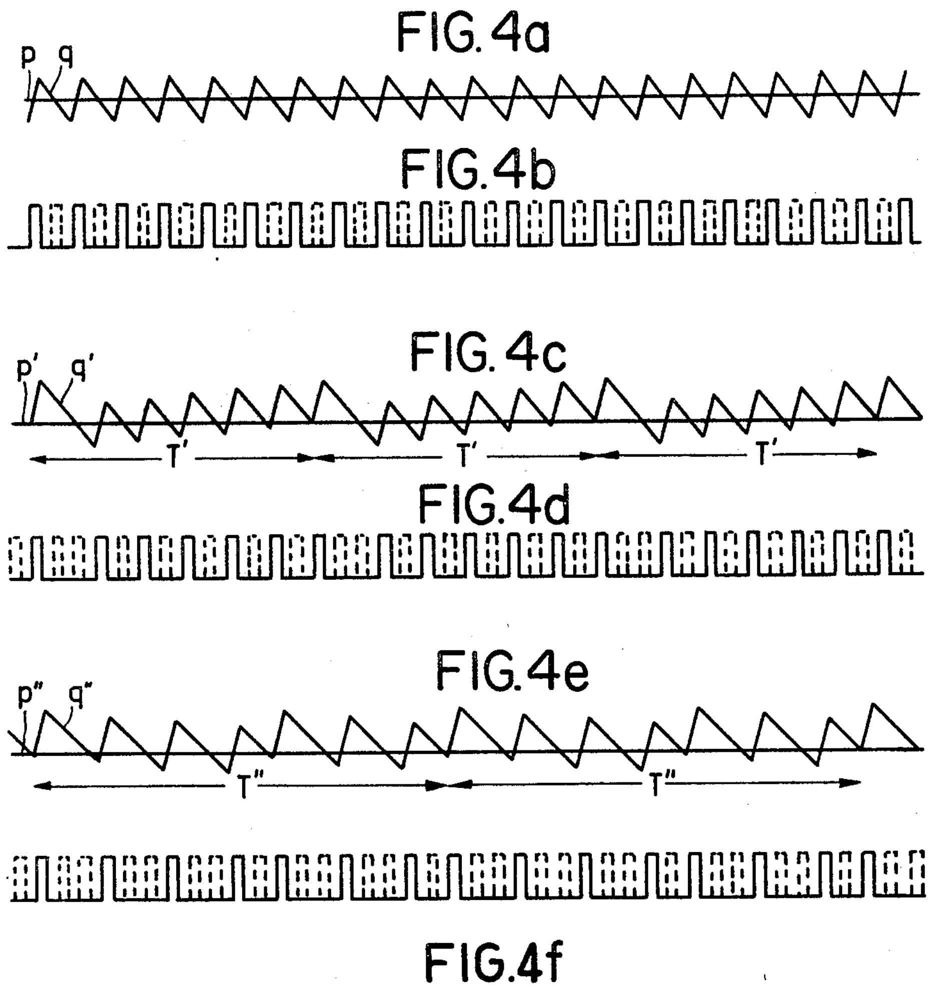

FIG. 4*a* illustrates on an enlarged time scale by the line *p* a given level control voltage and by the line *q* the the associated comparison signal and in FIG. 4*b* the transmitted pulses are represented by full lines and the interrupted pulses by broken lines. From FIG. 4*b* it will be apparent that pulses of the pulse generator 7 are periodically passed and suppressed by the pulse delta modulator 8 and the transmitted pulse sequence has a repetition frequency equal to half the frequency of the pulse generator, said repetition frequency lying beyond the speech band from 300 to 3400 kcs. If, for example, the pulse frequency is 10 kcs., half the pulse frequency is 5 kcs. and the latter frequency can be suppressed in a simple manner by means of filters.

However, if the magnitude of the level control voltage is varied the number of pulses transmitted in a unit will vary by an integral number. With a reduction of the level control, voltage by $\approx 70\%$, for example, as is indicated in FIG. 4*c* by *p*, the comparison signal will show the variation designated by *q'* and the transmitted pulses are shown in FIG. 4*d*. From these figures it will be apparent that the absence of pulses from the transmitted pulse sequence due to the reduction of the level control voltage results in that periodical pulse patterns appear with a repetition period indicated in the figure by T'. If, for example, the frequency of the pulse generator is 10 kcs., $T'=13\times10^{-4}$ seconds, which corresponds to a frequency of $\approx 0.77$ kc. It is this very frequency of 0.77 kc. and its harmonics lying in the speech band which cause the disturbing effect in this arrangement.

By way of illustration FIGS. 4*e* and 4*f* are time diagrams for the case in which the level control voltage *p''* is reduced by about 98%, while *q''* represents the comparison signal; the transmitted pulse sequence is illustrated in FIG. 4*f*. From this figure it will be seen that the transmitted pulse sequence includes a periodic pulse pattern having a repetition period $T''=19\times10^{-4}$ seconds, so that a frequency of $\approx 0.52$ kc. and its harmonics lying in the speech band cause the disturbance.

With an increase of the level control voltage disturbing frequencies are introduced in a similar manner into the speech band.

Like the quantization noise the phenomenon illustrated by the time diagrams of FIG. 4 is due to the quantized signal transmission, but said phenomenon differs essentially from the quantization noise in the resultant frequency spectrum. Whereas the quantization noise has a continuous frequency spectrum in the speech band, this phenomenon gives rise to discrete frequencies which have a particularly disturbing effect since they have no correlation to the speech signal. On the other hand these interference frequencies have a similarity to the quantization noise in that the level progressively decreases with an increasing frequency of the pulse generator 7 so that with pulse frequencies from 15 to 20 kcs. the influence on the speech quality becomes substantially negligible.

On the basis of these results of the investigations into the behaviour of pulse delta modulation with very low pulse frequencies a reasonable speech quality is maintained and, in addition, a further reduction of the pulse frequencies by a factor of about 2 is enabled, since for the transmission of the level control voltage to the associated receiver the level voltage generators 19, 20 of the receiver is connected to a separate transmitting device while between this transmitting device and the pulse modulator 21 there is arranged a local receiver whose output signal modulates the energy content of the pulses applied to the pulse modulator 21, while the circuit of the pulse delta modulator 8 includes a device compensating the varying level control signal at the input of the pulse delta modulator 8.

FIGS. 5 and 6 show particularly advantageous embodiments of a transmitter and a receiver according to the invention. Elements corresponding to those of FIG. 1 and 2 are designated by the same reference numerals.

The separate transmitting device of FIG. 5 is formed by a second pulse delta modulation transmitter comprising a second pulse delta modulator 30 and a pulse generator 31 connected to the former, a pulse regenerator 32 controlled by the pulse generator 31, a comparison circuit 33 including a local receiver having an integrating network 34, which is connected to a subtracting device 35 to which is applied, in addition, the output signal of the level voltage generators 19, 20. In this arrangement the output signal of the local receiver in the comparison circuit 33 modulates, via a low bandpass filter 36, the amplitude of the pulses applied to the pulse amplitude modulator 37 in the comparison circuit of the first pulse delta modulator, while the pulses regenerated in the pulse regenerator 32 are applied via the conductor 38 to the associated receiver. The frequency of the pulse generator 31 is, for example, a factor 10 lower than that of the pulse generator 7. If desired, the pulses of the pulse generator 31 may be derived by means of a frequency divider from the pulse generator 7.

In the arrangement shown the pulse delta modulator 37 is a double modulator for the compensation of the level control signal and it is provided with two output terminals 39, 40; in the manner described with reference to FIG. 1 a pulse is obtained at the terminal 39 solely at a positive difference voltage, whereas pulses only appear at the terminal 40 when the difference voltage is negative. Each of the output terminals 39, 40 is connected to a circuit including a pulse regenerator 41, 42 controlled by the pulse generator 7 and a pulse amplitude modulator 43, 44 controlled in parallel combination by the output signal of the local receiver of the second pulse delta modulator 30 in the comparison circuit 33; the output pulses of said two pulse amplitude modulators 43, 44 are applied via a subtracting device 45 to the integrating network 11. The output pulses of the pulse regenerator 41 are transmitted via the output conductor 10 to the associated receiver.

The operation of the transmitting device described above will now be described more fully.

In the transmitting device described the speech signal and the output signal of the level voltage generators 19, 20 are processed in different ways. The output signal of the level voltage generator is applied to the pulse delta modulator 30, and the number of pulses passed by the pulse delta modulator 30 and hence the pulse density will be adjusted so that the average direct voltage component of the pulses at the output of the integrating network 34 in the comparison circuit 33 is substantially equal to that of the level control signal applied to the pulse delta modulator 30. At the output of the pulse delta modulator 30 a variation of the pulse density appears, which pulse density is adjusted in the absence of a level control signal by means of an adjusting voltage from a direct voltage source 46 applied to the subtracting device 35 so that the resultant pulse frequency is about 3/10 of the frequency of the pulse generator 31. The output signal of the local receiver derived from the integrating network 34 is applied via the low bandpass filter 36 as a modulating voltage to the amplitude modulators 43, 44 after combination with a constant reference voltage from the conductor 48 in a combination device 47, the value of said reference voltage being such that in the absence of a level voltage the amplitude of the output pulses of the pulse amplitude modulators 43, 44 is reduced to a very low value for example to 1 to 20%.

The speech signal is applied to the pulse delta modulator 37 and according as the difference signal of the subtracting device 4 has a positive or a negative polarity a pulse will appear at the output terminal 39 or at the output terminal 40. At the output terminals 39, 40 of the pulse delta modulator 37 there appear for example the pulse sequences designated by $x$ and $y$ whose amplitude is modulated subsequent to regeneration in the pulse regenerators 41, 42, in the pulse amplitude modulators 43, 44 by the output voltage of the comparison circuit 33 associated with the second pulse delta modulator 30 so that at the output terminals of both amplitude modulators 43, 44 for example the pulse sequences $r$ and $s$ appear, which are combined in the combination device 45 which performs subtraction. Thus at the output of the subtracting device 45 there appears the pulse sequence $t$ of alternating positive and negative pulses and by integration in the integrating network 11 the components of the positive and negative pulses varying with the level control signal compensate each other so that at the input of the pulse delta modulator 37 no varying direct voltage will occur.

Independently of the value of the level control signal the pulse sequence transmitted by the pulse delta modulator 37 via the conductor 10 exhibits invariably a constant pulse density which may be equal to half the frequency of the pulse generator 7 so that the serious disturbing effect of interference frequencies on the reproduction quality due to a varying pulse density is avoided.

In the associated receiver of FIG. 6 the pulses transmitted by the pulse delta modulators 30, 37 are processed in the same manner as in the local receiver of the transmitter, in order to restore the transmitted speech signal, that is to say the pulses arriving through the conductor 12 and emanating from the pulse delta modulator 37 are applied to a double pulse regenerator 49, having output terminals 50, 51 the pulse sequences designated by $x$ occurs when a pulse arrives through the conductor 12 and at the terminal 51 a pulse appears when no pulse arrives through the conductor 12. This means that at the terminals 50, 51 the pulse sequences designated by $x$ and $y$ of FIG. 5 appear, which are applied for further processing to amplitude modulators 52, 53.

The pulses entering through the conductor 54 from the pulse delta modulator 30 are applied to a pulse regenerator 55, to which a pulse generator 56 is connected, the regenerated pulses being applied through an integrating network 57 and a low bandpass filter 58 to a combination device 59 to which is applied, in addition, a constant reference voltage via the conductor 60. In the manner described with reference to FIG. 5 the combination device 59 controls in parallel combination the two pulse amplitude modulators 52, 53 whose output pulses are applied to an integrating network 15 via a subtracting device 61. The speech signal thus restored is applied via the low bandpass filter 16 to the low frequency amplifier 17, which is connected to the reproducing device 18.

In the transmission system described above it is ensured not only that the pulses transmitted by the pulse delta modulator 37 have a constant pulse density but also that the amplitudes controlled by the pulses of the pulse delta modulator 30 at a transmitter end and at a receiver end are equal to each other. At the transmitter end (FIG. 5) the pulses of the pulse delta modulator 30 are applied, for amplitude control, via the integrating network 34 of the local receiver in the comparison circuit, via the low bandpass filter 36 and the combination device 47, to the two amplitude modulators 43, 44 which corresponds completely to the amplitude control at a receiver end (FIG. 6) where the incoming pulses of the pulse delta modulator 30 are applied in completely the same manner via the integrating network 57, the low bandpass filter 58 and the combination device 59 to the two amplitude modulators 52, 53.

In this way a complete synchronism of the amplitudes controlled at the transmitter end and at the receiver end is obtained, which means that relative amplitude and time variations in the amplitudes controlled at the transmitter end and at the receiver end are avoided. It is thus ensured inter alia that on the one hand no severe requirements have to be satisfied by the operation of the filters 36, 58 so that shorter delay times are concerned and consequently the level control voltage follows the speech signal in an improved manner while moreover the accuracy of the transmission of the level control signal need not meet severe requirements either, which means that for the transmission of the level control signal the frequency of the pulse generator 31 may be low.

The two measures i.e. the constancy of the pulse density of the pulses transmitted by the pulse delta modulator 37 and the synchronism of the amplitudes controlled in the transmitter and in the receiver are of essential importance for obtaining a reasonable reproduction quality at the extremely low pulse frequencies (lower than 15 kcs.) and said two measures provide the remarkable effect that it is thus possible to transmit a speech signal in the band from 0.3 to 3.4 kcs. by pulse delta modulation with a reasonable quality within a low frequency channel of 4 kcs. In the pulse delta modulation arrangement described above the frequency of the pulse generator 7 was about 7 kcs. and that of the pulse generator 31 about 0.7 kc. which corresponds to a total pulse frequency of about 7.7 kcs., which pulse signal can be transmitted within a low frequency channel of 4 kcs. since the transmission of this pulse signal requires a bandwidth of slightly more than half the pulse frequency.

Of this elaborately tested pulse delta modulation system the following data are given:

Time constant networks 34, 57—10 msecond
Limit frequency network 20—50 c./s.
Limit frequency networks 36, 58—60 c./s.

It should be noted that it is not necessary to transmit the pulses produced by the two pulse delta modulators 30, 37 through separate conductors 10, 28 to the associated receiver since the transmission may be performed by using time multiplex or frequency multiplex through a single conductor. It should furthermore be noted that the compensation of the varying level voltage by the double construction of the pulse delta modulator 37 and of the pulse regenerator 49 at the receiver end may be obtained in a different manner since pulses of opposite polarities may be directly derived from the separate terminals 39, 40 and 50, 51 of said devices. The embodiments shown in FIGS. 5 and 6 have, however, the advantage that the circuits connected to the separate output terminals 39, 40 and 50, 51 are of identical construction.

What is claimed is:

1. A system for signal transmission by pulse delta modulation, said system being of the type comprising means for receiving input signals, a pulse generator, a first pulse modulator means connected to said pulse generator, first local receiver means, means connecting the output of said first pulse modulator means to said local receiver, a comparison circuit responsive to the difference between said input signals and the output of said local receiver for controlling said first pulse modulator means, first means for transmitting the output of said first pulse modulator means, a level voltage generator for generating a level voltage as determined by the intensity of said input signal, means for applying said input signals to said level voltage generator, a second transmitting device for transmitting the output of said level voltage generator, a second local receiver connected to said second transmitting device, and means connecting the output of said first pulse modulator means to said first mentioned local receiver comprising a second modulator connected to modulate the energy content of pulses applied thereto in accordance with the output of said second local receiver, and means to connect the output of said second local receiver as a modulating signal input to said second modulator.

2. A system as claimed in claim 1 wherein said second transmitting device comprises a third pulse modulator; a second comparison circuit coupled to said second local receiver, said level voltage generator, and said third pulse modulator; and a second pulse generator having a frequency lower than said first pulse generator and coupled to said third pulse modulator.

3. A system as claimed in claim 2 further comprising a series circuit including a filter and an adder; and a reference voltage source coupled to said adder; said series circuit being coupled between said second local receiver and said second pulse modulator.

4. A system as claimed in claim 2 wherein said first pulse modulator comprises two output terminals, said first output terminal providing a signal when the input signal to said first pulse modulator is positive, said second output terminal providing a signal when the input signal to said first pulse modulator is negative; said second modulator comprising two sections for receiving the output signals of said first pulse modulator respectively and further comprising a combination device for combining the output signals of said two sections of said second modulator.

5. A system as claimed in claim 4 wherein the output signals of said first modulator are of identical polarity and said combination device comprises a subtraction circuit.

6. A system as claimed in claim 5 further comprising a source of an adjusting voltage coupled to said third pulse modulator.

7. The system of claim 1 further comprising a remote receiver including a fourth pulse modulator for receiving the output of said first transmitting means and second applying means for receiving the signal transmitted by said second transmitting device and applying it to said fourth modulator for varying the energy content of the output signals thereof.

8. The system of claim 7 wherein said fourth modulator includes two input and two output terminals; and further comprising a pulse regenerator having two output terminals coupled to the input terminals of said fourth modulator respectively, one of said regenerator output terminals supplying a pulse in the presence of an input pulse, the other regenerator output terminal supplying a pulse in the absence of an input pulse; and a second combination device coupled to the output terminals of said fourth modulator.

9. The system of claim 8 wherein said pulse regenerator output pulses are of identical polarity and said second combination device comprises a subtraction circuit.

10. The system of claim 9 wherein said second applying means comprises a second series circuit including a second filter and a second adder, and a second source of a reference voltage coupled to said second adder.

References Cited

UNITED STATES PATENTS

| | | | |
|---|---|---|---|
| 2,816,267 | 12/1957 | De Jager et al. | 332—11 |
| 3,249,870 | 5/1966 | Greefkes | 325—38.1 |

ROBERT L. GRIFFIN, Primary Examiner

J. A. BRODSKY, Assistant Examiner

U.S. Cl. X.R.

179—15; 325—141, 326; 332—11; 343—203